United States Patent
Oberoi et al.

(10) Patent No.: US 12,290,919 B2
(45) Date of Patent: May 6, 2025

(54) FASTENING END EFFECTOR

(71) Applicant: The Boeing Company, Chicago, IL (US)

(72) Inventors: Harinder Singh Oberoi, Snohomish, WA (US); Kevin Marion Barrick, Kingston, WA (US); Yuanxin Charles Hu, Newcastle, WA (US); Melissa A. Johnson, Puyallup, WA (US); Laura Carolyn Foster, Brier, WA (US)

(73) Assignee: The Boeing Company, Chicago, IL (US)

( * ) Notice: Subject to any disclaimer, the term of this patent is extended or adjusted under 35 U.S.C. 154(b) by 149 days.

(21) Appl. No.: 17/936,467

(22) Filed: Sep. 29, 2022

(65) Prior Publication Data

US 2024/0109207 A1    Apr. 4, 2024

(51) Int. Cl.
| | |
|---|---|
| B23P 11/00 | (2006.01) |
| B25J 15/00 | (2006.01) |
| B25J 15/10 | (2006.01) |
| B64F 5/10 | (2017.01) |

(52) U.S. Cl.
CPC ......... *B25J 15/103* (2013.01); *B25J 15/0042* (2013.01); *B64F 5/10* (2017.01)

(58) Field of Classification Search
CPC .... B25J 15/01; B25J 15/0042; B25J 15/0009; B25J 15/0038; B64F 5/10; B21J 15/142; B21J 15/147; B21J 15/32; B21J 15/02; B21J 15/34; B23Q 7/04
See application file for complete search history.

(56) References Cited

U.S. PATENT DOCUMENTS

| | | | |
|---|---|---|---|
| 4,810,018 A | 3/1989 | van de Ven et al. | |
| 4,995,148 A | 2/1991 | Bonomi et al. | |
| 6,108,896 A | 8/2000 | Gignac et al. | |
| 6,253,448 B1 * | 7/2001 | Zieve | B21J 15/32 29/709 |
| 6,357,101 B1 | 3/2002 | Sarh et al. | |
| 6,772,508 B2 | 8/2004 | Bloch et al. | |
| 6,949,057 B2 | 9/2005 | Everson et al. | |
| 7,805,829 B2 | 10/2010 | Herrmann et al. | |
| 9,266,687 B2 | 2/2016 | Stepan et al. | |
| 9,486,917 B2 | 11/2016 | Reid et al. | |

(Continued)

FOREIGN PATENT DOCUMENTS

| | | |
|---|---|---|
| CN | 208146848 U * | 11/2018 |
| CN | 109483580 A | 3/2019 |

(Continued)

OTHER PUBLICATIONS

English translation of DE-4429737-A1 (Year: 1995).*

(Continued)

*Primary Examiner* — Jun S Yoo
(74) *Attorney, Agent, or Firm* — Yee & Associates, P.C.

(57) ABSTRACT

A fastening end effector is presented. The fastening end effector comprises a hammering insertion die translatable into and out of a housing of the fastening end effector along a longitudinal axis of the fastening end effector; and grippers positioned circumferentially around the hammering insertion die to hold a head of a fastener against the hammering insertion die, the grippers independently moveable relative to the hammering insertion die.

20 Claims, 13 Drawing Sheets

(56) References Cited

U.S. PATENT DOCUMENTS

| | | |
|---|---|---|
| 9,505,051 B2 | 11/2016 | Oberoi et al. |
| 9,708,079 B2 | 7/2017 | DesJardien et al. |
| 9,879,704 B2 | 1/2018 | Hanninen et al. |
| 11,027,326 B2 | 6/2021 | Eusterwiemann |
| 2016/0082501 A1 | 3/2016 | Zieve et al. |
| 2019/0366553 A1 | 12/2019 | Simkins |
| 2021/0138663 A1 | 5/2021 | Loulavi et al. |

FOREIGN PATENT DOCUMENTS

| | | | | |
|---|---|---|---|---|
| CN | 109676353 A | | 4/2019 | |
| CN | 210023640 U | | 2/2020 | |
| CN | 210702310 U | * | 6/2020 | |
| CN | 114505442 A | * | 5/2022 | |
| DE | 4429737 A1 | * | 12/1995 | ............ B21J 15/32 |

OTHER PUBLICATIONS

English translation of CN-210702310-U (Year: 2020).*
English translation of CN-114505442-A (Year: 2022).*
English translation of CN-208146848-U (Year: 2018).*
European Patent Office Extended Search Report, dated Jan. 31, 2024, regarding Application No. EP23190068.9, 8 pages.

* cited by examiner

FASTENING END EFFECTOR

BACKGROUND INFORMATION

1. Field

The present disclosure relates generally to manufacturing, and more specifically to a fastening end effector.

2. Background

In current assembly of aircraft structures using robotics, the drilling and fastening is accomplished using dual sided clamp-up with robots. Fasteners are provided to fastening end effectors using a series of tubes. However, the tubes may not provide the fasteners in the same orientation. In some instances, the tubes may become blocked by a fastener.

Therefore, it would be desirable to have a method and apparatus that take into account at least some of the issues discussed above, as well as other possible issues.

SUMMARY

An illustrative embodiment provides a fastening end effector comprising a hammering insertion die translatable into and out of a housing of the fastening end effector along a longitudinal axis of the fastening end effector and grippers positioned circumferentially around the hammering insertion die to hold a head of a fastener against the hammering insertion die, the grippers independently moveable relative to the hammering insertion die.

Another illustrative embodiment provides a method comprising extending a hammering insertion die through a housing of a fastening end effector along a longitudinal axis of the fastening end effector and moving grippers positioned circumferentially around the hammering insertion die inward towards the hammering insertion die to hold a head of a fastener against the hammering insertion die.

Another illustrative embodiment provides a fastening end effector comprising a longitudinal axis and a hammering system translatable along the longitudinal axis, the hammering system comprising: a hammering insertion die, grippers positioned circumferentially around the hammering insertion die, and a force application mechanism.

Another illustrative embodiment provides a method of fastening a structure. The method comprises retracting a fastener through a housing of a fastening end effector along a longitudinal axis of the fastening end effector, the fastener held by grippers against a hammering insertion die of the fastening end effector. The fastening end effector is normalized relative to a structure, and the fastener is inserted into the structure by extending the fastener and hammering insertion die through the housing of the fastening end effector along the longitudinal axis.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations as described herein. For example, the illustrative embodiments recognize and take into account that in some instances a portion of a fastening end effector contacts a structure to provide clamp-up prior to insertion of a fastener. The illustrative embodiments recognize and take into account that it may be desirable to have a portion of an end effector that extends past the fastener to contact the structure.

The illustrative embodiments provide a fastening end effector that can be used to insert a fastener into either metal or composite structures. The illustrative embodiments provide a fastening end effector that grips a fastener and stores the fastener in the end effector while the end effector is positioned and normalized relative to the structure.

Figure 1:
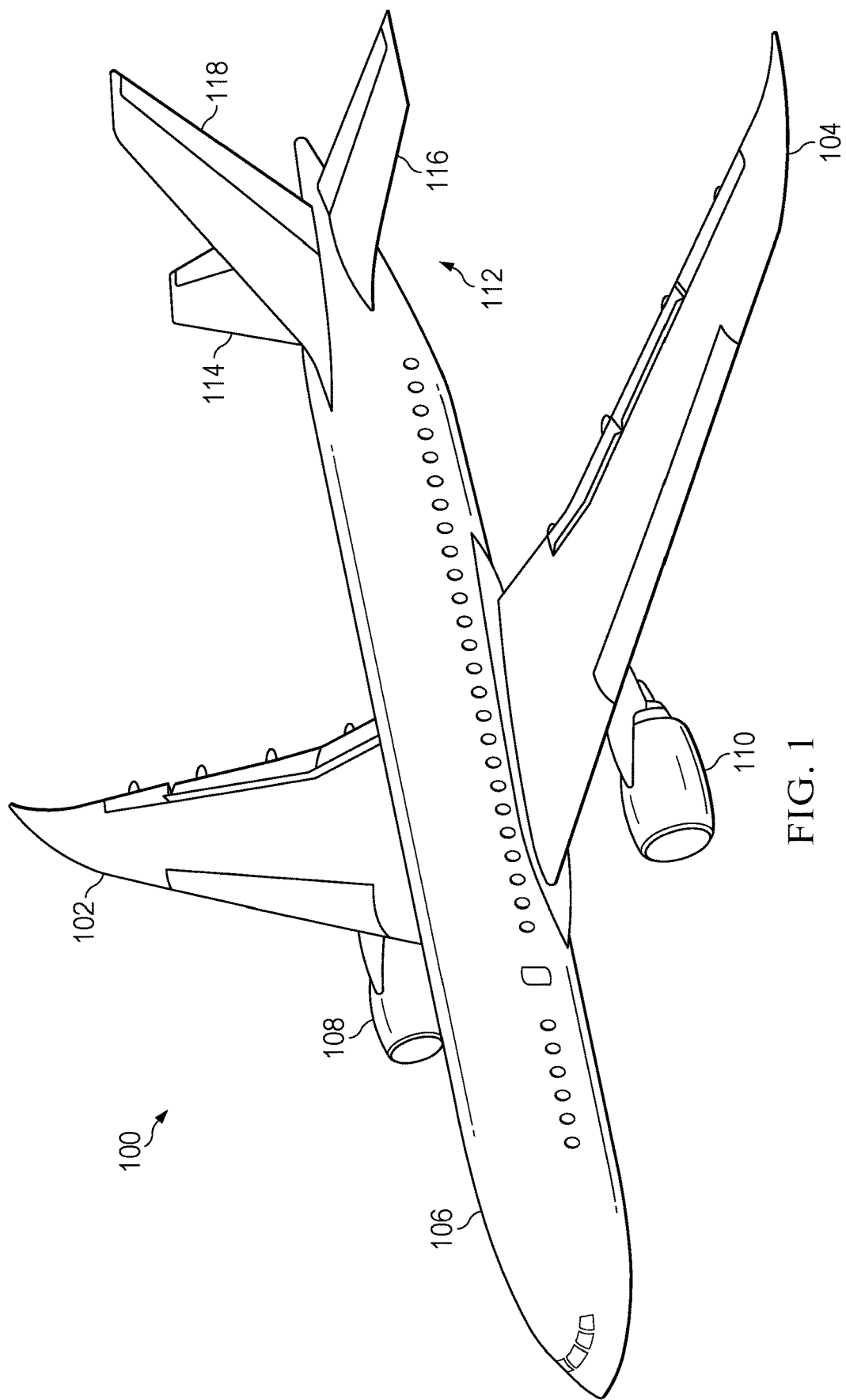
FIG. 1 is an illustration of an aircraft in which the illustrative embodiments may be implemented.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of a platform that can be manufactured using fasteners from a fastening end effector of the illustrative examples. For example, portions of body 106, wing 102, or wing 104 can be manufactured using fastening end effectors of the illustrative examples.

Figure 2:
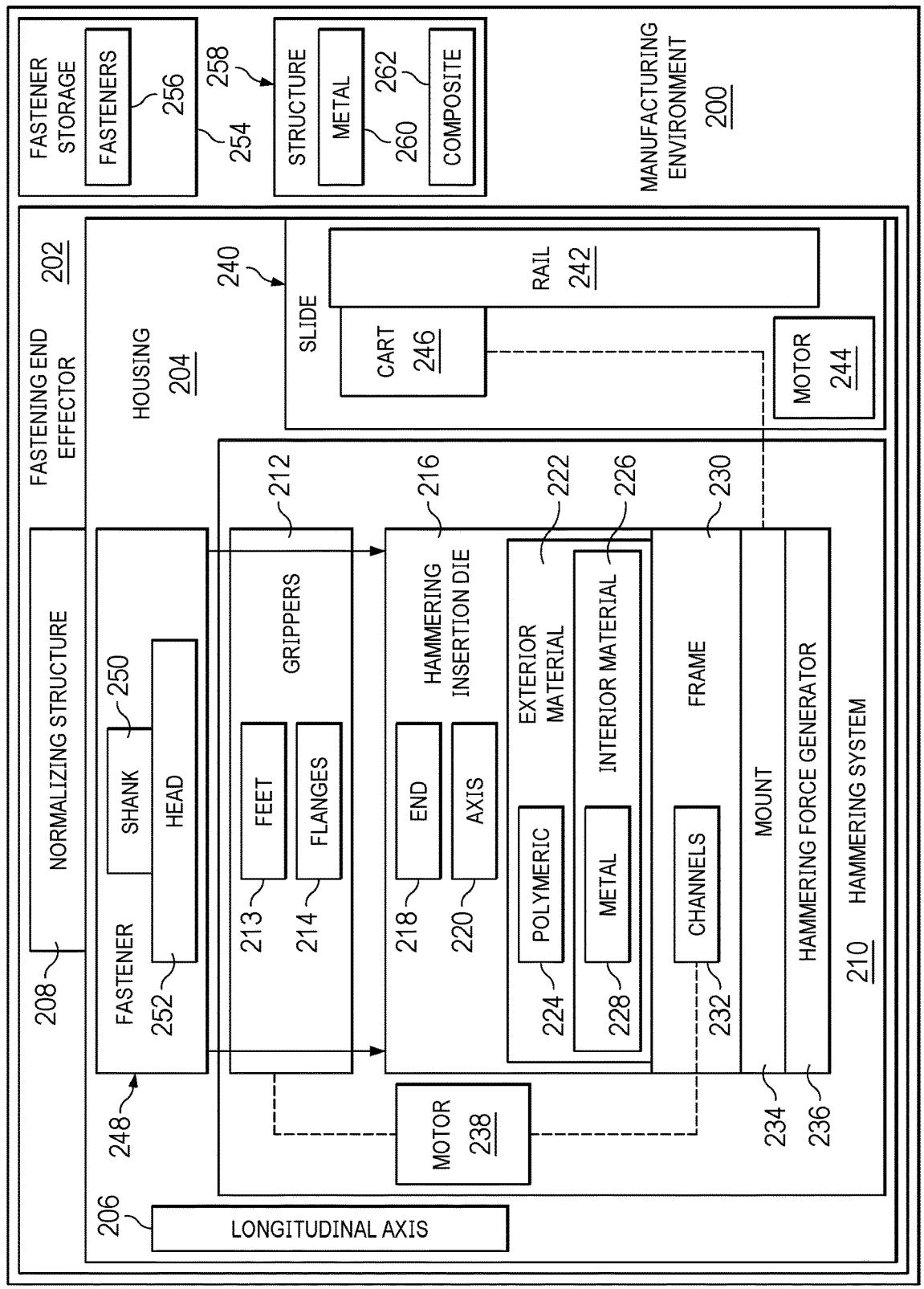
FIG. 2 is an illustration of a block diagram of a fastening end effector in a manufacturing environment in accordance with an illustrative embodiment.

Turning now to FIG. 2, a block diagram illustrating a fastening end effector is depicted in accordance with an illustrative embodiment. Manufacturing environment 200 has fastening end effector 202 configured to apply fasteners 256 and insert within structure 258. Fastening end effector 202 can be used to manufacture portions of aircraft 100 of FIG. 1. be implemented in manufacturing environment 200.

Fastening end effector 202 comprises hammering insertion die 216 translatable into and out of housing 204 of fastening end effector 202 along longitudinal axis 206 of fastening end effector 202 and grippers 212 positioned circumferentially around hammering insertion die 216 to hold head 252 of fastener 248 against hammering insertion die 216. Grippers 212 are independently moveable relative to hammering insertion die 216. In some illustrative examples, grippers 212 are referred to as gripper fingers.

Fastening end effector 202 comprises a housing 204 with a longitudinal axis 206. Within housing 204 is hammering system 210. Hammering system 210 is configured to insert fastener 248 into structure 258 during joining operations. In some illustrative examples, structure 258 comprises metal 260. When structure 258 comprises metal 260, hammering system 210 provides the force to drive fastener 248 into structure 258. Hammering system 210 drives fastener 248 into structure 258 using hammering insertion die 216 of fastening end effector 202.

In some illustrative examples, structure 258 comprises composite 262. When structure 258 comprises composite 262, hammering system 210 holds fastener 248 in place as a collar is connected to fastener 248. Hammering insertion die 216 of fastening end effector 202 holds fastener 248 in place in structure 258 while a collar is connected to fastener 248.

Hammering system 210 comprises hammering insertion die 216 extends through frame 230. Hammering insertion die 216 comprises end 218 and axis 220. Grippers 212 are configured to hold fastener 248 against end 218 of hammering insertion die 216. Hammering insertion die 216 comprises exterior material 222 surrounding interior material 226. Interior material 226 has a greater density than exterior material 222. In some illustrative examples, exterior material 222 is polymeric 224. In some illustrative examples, interior material 226 comprises metal. In some illustrative examples, hammering insertion die 216 comprises exterior material 222 that is polymeric 224 and interior material 226 comprising metal 228. In some illustrative examples, interior material 226 comprises tungsten. Interior material 226 enables driving force to be transferred to fastener 248.

When structure 258 comprises metal 260, fastener 248 is driven into structure 258 using force from hammering force generator 236. Hammering force generator 236 is connected to hammering insertion die 216. Hammering force generator 236 is part of hammering system 210 and is configured to translate along longitudinal axis 206 of fastening end effector 202 with hammering insertion die 216. Hammering force generator 236 provides hammering force to hammering insertion die 216.

Hammering system 210 comprises mount 234. Hammering force generator 236 and frame 230 are connected to mount 234. Mount 234 couples hammering system 210 to slide 240. Slide 240 comprises rail 242 and cart 246. Motor 244 moves the hammering system 210 along rail 242. Hammering system 210 translates along longitudinal axis 206 of fastening end effector 202 using slide 240. Hammering system 210 is connected to cart 246 of slide 240. As cart 246 moves along rail 242, hammering system 210 translates along longitudinal axis 206 of fastening end effector 202. Movement of hammering system 210 using slide 240 extends grippers 212 outside of housing 204 and retracts fastener 248 within housing 204. Motor 244 of slide 240 propels cart 246 and hammering system 210 connected to cart 246. Mount 234 is connected to slide 240 facilitating translation of hammering insertion die 216 and grippers 212 along longitudinal axis 206 of fastening end effector 202.

Hammering insertion die 216 extends through frame 230. Frame 230 has channels 232 configured to guide movement of grippers 212 relative to hammering insertion die 216. Grippers 212 surround hammering insertion die 216. Grippers 212 include feet 213 which fit in channels 232 in frame 230. Each gripper of grippers 212 comprises a respective foot of feet 213 configured to fit into and travel along a respective channel of channels 232. By moving feet 213 within channels 232, grippers 212 move circumferentially away from axis 220 of hammering insertion die 216. The grippers 212 open to receive head 252 of fastener 248 by moving feet 213 away from hammering insertion die 216 within channels 232. Feet 213 of grippers 212 move within channels 232 towards hammering insertion die 216 for grippers 212 to contact head 252 of fastener 248.

Grippers 212 comprise flanges 214 configured to hold head 252 of fastener 248. Grippers 212 comprise flanges 214 configured to retain head 252 of fastener 248 against hammering insertion die 216. Moving grippers 212 inward towards hammering insertion die 216 places flanges 214 of grippers 212 beneath head 252 of fastener 248 to hold head 252 of fastener 248 between hammering insertion die 216 and flanges 214. Flanges 214 grip fastener 248 such that head 252 contacts end 218 of hammering insertion die 216 and shank 250 points away from housing 204.

Motor 238 is operably connected to feet 213 of grippers 212. Motor 238 moves feet 213 of grippers along channels 232 within frame 230 to cause grippers 212 to open and close.

Fastening end effector 202 comprises normalizing structure 208. Normalizing structure 208 comprises at least one of a camera, a laser, or a physical component. Normalizing structure 208 at the end of housing 204 is configured to normalize fastening end effector 202 relative to structure 258.

In some illustrative examples, fastener storage 254 is present in manufacturing environment. In some illustrative examples, fastener storage 254 stores fasteners 256 in a position for fastening end effector 202 to retrieve a fastener, such as fastener 248. Fastening end effector 202 may retrieve fastener 248 from among fasteners 256 kept in fastener storage 254.

In some illustrative examples, fasteners 256 have the same fastener diameter. In some illustrative examples, fasteners 256 have more than one fastener diameter. Grippers 212 and hammering insertion die 216 can accommodate multiple fastener diameters. Movement of grippers 212 outwardly away from hammering insertion die 216 allows fastening end effector to accept fasteners 256 with different diameters.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In some illustrative examples, normalizing structure 208 is not present on the end of housing 204. In some illustrative examples, additional components can be between hammering insertion die 216 and hammering force generator 236. For example, a hammering module can be present between hammering force generator 236 and hammering insertion die 216 to transfer reciprocation motion from hammering force generator 236 to hammering insertion die 216. As another example, a connector is present on an opposite end of housing 204 from normalizing structure 208. The connector (not depicted) is configured to connect the fastening end effector 202 to a robotic arm (not depicted).

Figure 3:
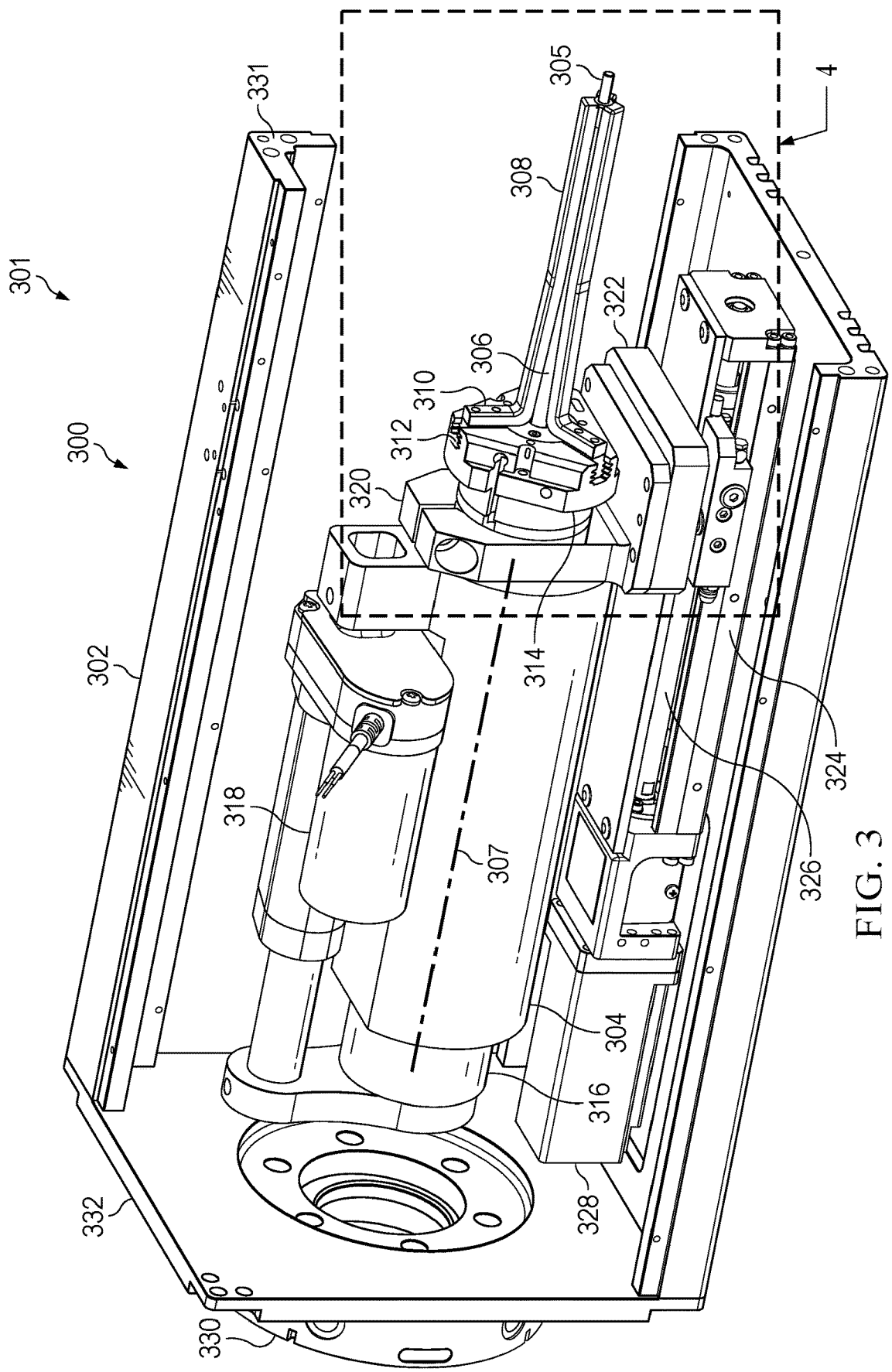
FIG. 3 is an illustration of a perspective view of a fastening end effector in accordance with an illustrative embodiment.

Turning now to FIG. 3, an illustration of a perspective view of a fastening end effector is depicted in accordance with an illustrative embodiment. Fastening end effector 300 is a physical implementation of fastening end effector 202 of FIG. 2.

In view 301 of fastening end effector 300, portions of fastening end effector 300 have been selectively removed for ease of illustration. In view 301, portions of housing 302 have been removed to better visualize hammering system 304.

Fastening end effector 300 comprises hammering insertion die 306 and grippers 308. Hammering insertion die 306 is translatable into and out of housing 302 of fastening end effector 300 along a longitudinal axis 307 of fastening end effector 300. Grippers 308 are positioned circumferentially around hammering insertion die 306 to hold a head of a fastener 305 against the hammering insertion die 306. The grippers 308 are independently moveable relative to the hammering insertion die 306.

Grippers 308 include feet 310 which fit in channels 312 in frame 314. Each gripper of grippers 308 comprises a respective foot of feet 310 configured to fit into and travel along a respective channel of channels 312. By moving feet 310 within channels 312, grippers 308 move circumferentially away from hammering insertion die 306. The grippers 308 open to receive the head of fastener 305 by moving feet 310 away from hammering insertion die 306 within channels 312. Feet 310 of grippers 308 move within channels 312 towards hammering insertion die 306 for grippers 308 to contact the head of fastener 305. Frame 314 has channels 312 configured to guide movement of grippers 308 relative to hammering insertion die 306.

Fastening end effector 300 comprises hammering force generator 318 connected to hammering insertion die 306 and configured to translate along longitudinal axis 307 of fastening end effector 300 with hammering insertion die 306. Hammering force generator 318 is connected to hammering insertion die 306 by hammering module 316. Hammering force generator 318 generates a reciprocation motion. Hammering module 316 transfers the reciprocation motion to hammering insertion die 306. hammering insertion die 306 transfers the force to fastener 305.

Mount 320 is connected to slide 324 facilitating translation of hammering insertion die 306 and grippers 308 along longitudinal axis 307 of fastening end effector 300. As depicted, mount 320 is connected to cart 322 of slide 324. Cart 322 moves along rail 326 of slide 324. Cart 322 is driven along rail 326 by motor 328.

Hammering insertion die 306 extends through end 331 of housing 302. Connector 330 is present on end 332 of housing 302. End 332 is an opposite end of housing 302 from where hammering insertion die 306 extends through housing 302. Connector 330 is configured to connect fastening end effector 300 to a robotic arm (not depicted).

Figure 4:
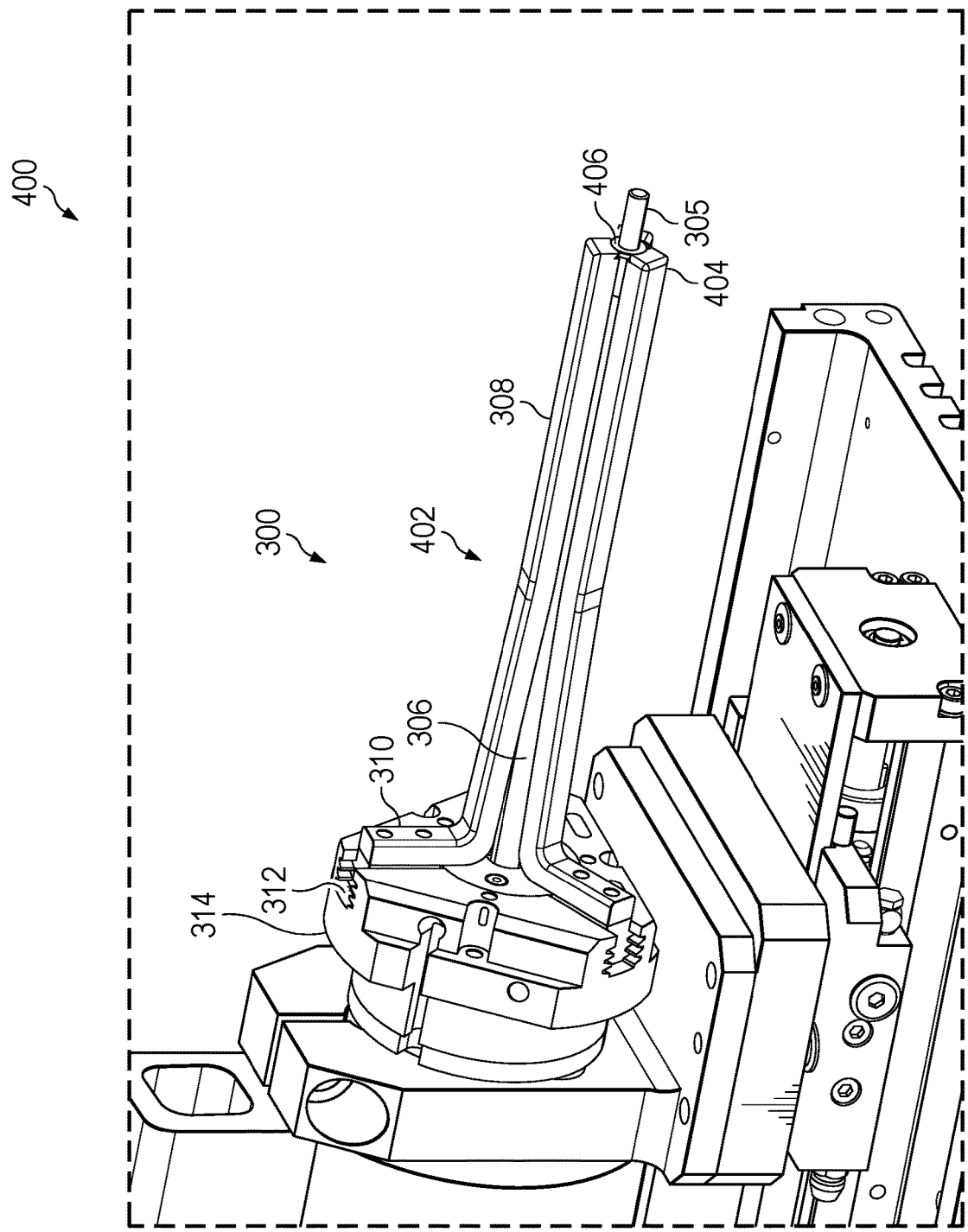
FIG. 4 is an illustration of a close perspective view of a hammering insertion die with grippers in a closed position in accordance with an illustrative embodiment.

Turning now to FIG. 4, an illustration of a close perspective view of a hammering insertion die with grippers in a closed position is depicted in accordance with an illustrative embodiment. View 400 is a view of a portion of a hammering system, such as hammer system 210 of FIG. 2. View 400 is a view of end effector 300 within box 4 in FIG. 3. In view 400, grippers 308 are in closed position 402. In view 400, grippers 308 are in closed position 402 to hold fastener 305 against hammering insertion die 306.

In view 400, flanges 404 of grippers 308 are visible. Flanges 404 are configured to retain head 406 of fastener 305 against hammering insertion die 306. Moving grippers 308 inward towards hammering insertion die 306 places flanges 404 of grippers 308 beneath head 406 of fastener 305 to hold head 406 of fastener 305 between hammering insertion die 306 and flanges 404.

Figure 5:
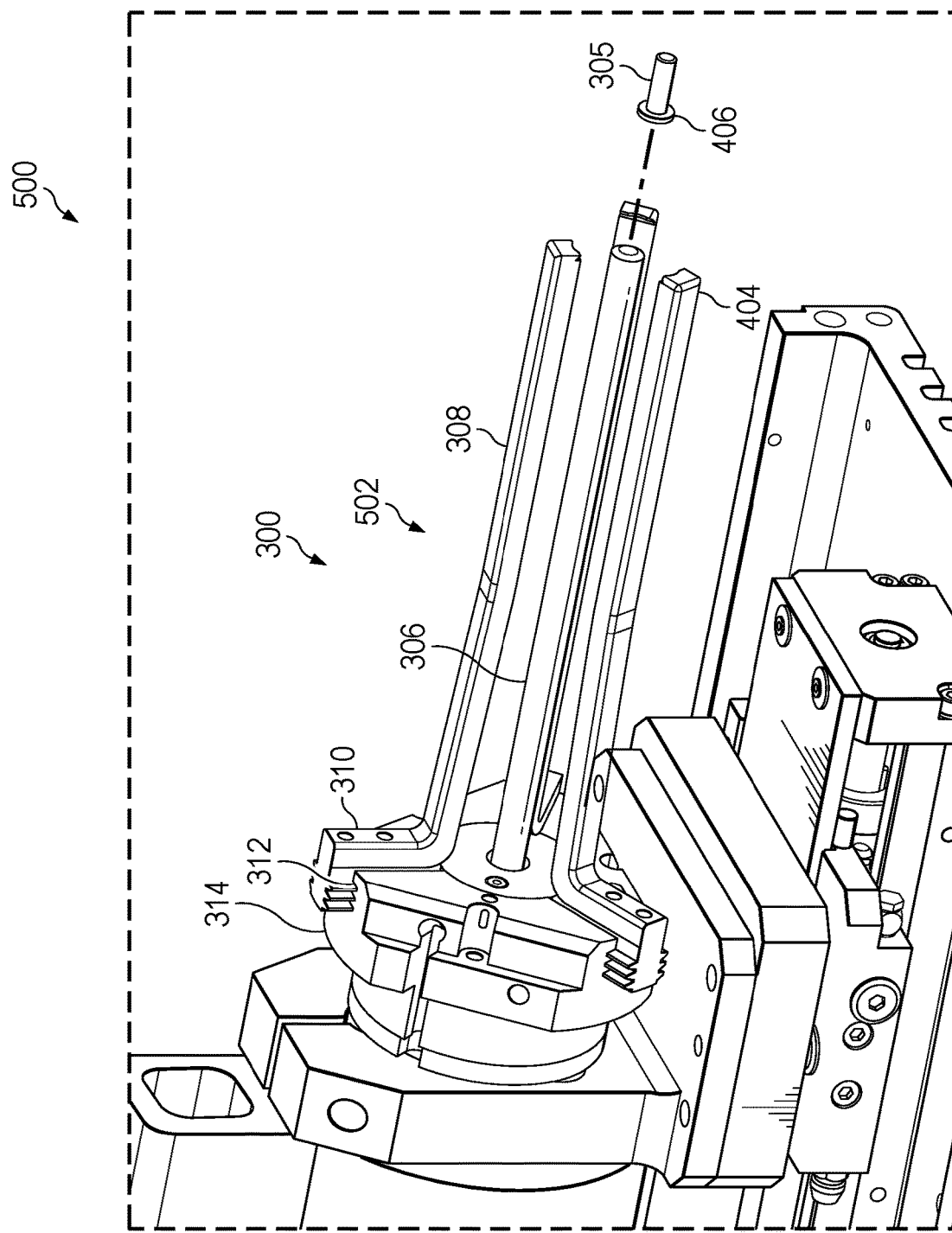
FIG. 5 is an illustration of a close perspective view of a hammering insertion die with grippers in an open position in accordance with an illustrative embodiment.

Turning now to FIG. 5, an illustration of a close perspective view of a hammering insertion die with grippers in an open position is depicted in accordance with an illustrative embodiment. View 500 is a view of end effector 300 within box 4 with grippers 308 in open position 502. To move grippers 308 between closed position 402 of FIG. 4 and open position 502 of FIG. 5, feet 310 have translated within channels 312 of frame 314.

In open position 502 hammering insertion die 306 is visible. In view 500, fastener 305 with head 406 is not yet held against hammering insertion die 306 by flanges 404 of grippers 308.

Figure 6:
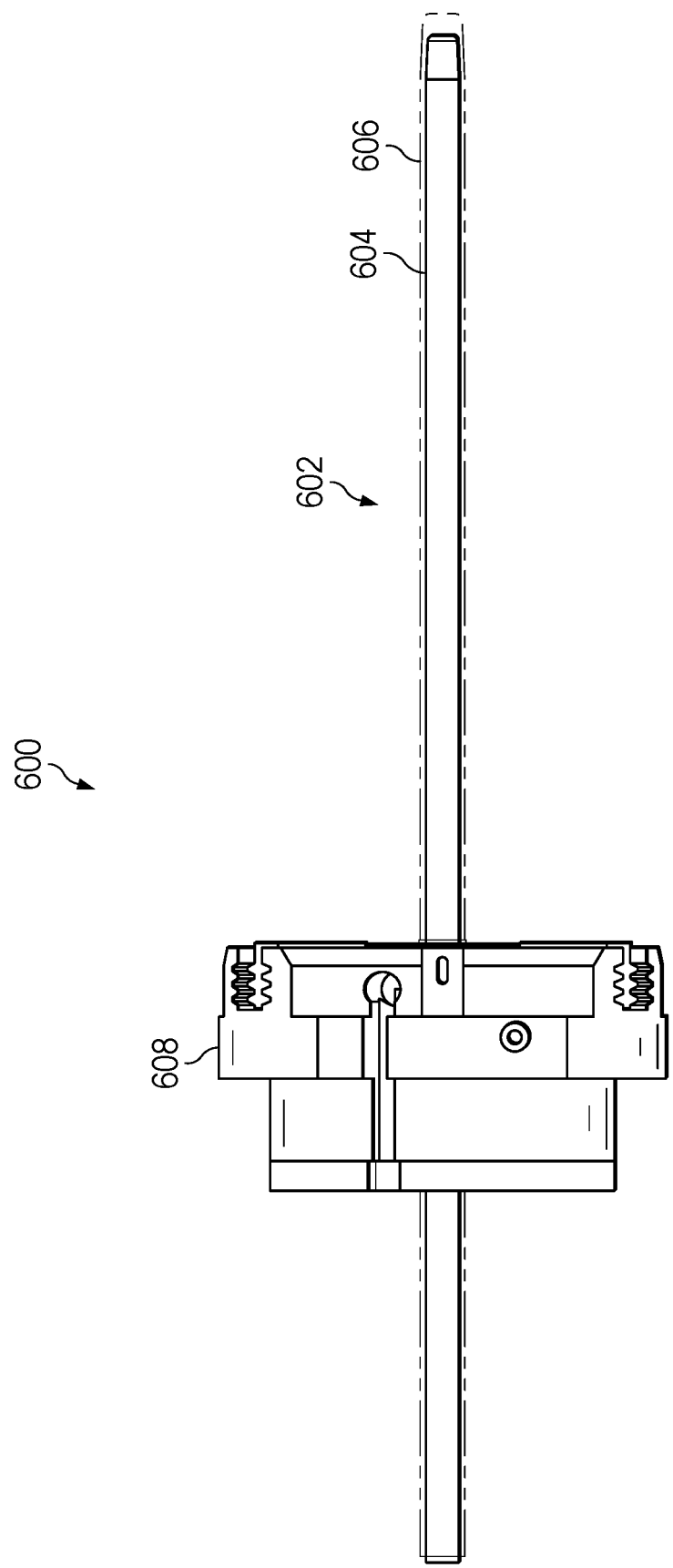
FIG. 6 is an illustration of a side cross-sectional view of a hammering insertion die in accordance with an illustrative embodiment.

Turning now to FIG. 6, an illustration of a side cross-sectional view of a hammering insertion die is depicted in accordance with an illustrative embodiment. In view 600, portions of a hammering system, such as hammer system 210 of FIG. 2 are depicted. In view 600, hammering insertion die 602 is depicted in a partially phantom view. As depicted, hammering insertion die 602 has interior material 604 and exterior material 606. Exterior material 606 surrounds interior material 604 and interior material 604 has a greater density than exterior material 606. In some illustrative examples, exterior material 606 comprises a polymeric material. In some illustrative examples, interior material 604 comprises a metal. In some illustrative examples, interior material 604 comprises tungsten.

As depicted, hammering insertion die 602 extends through frame 608. Although not depicted in view 600, hammering insertion die 602 connects to a hammering force generator.

Figure 7:
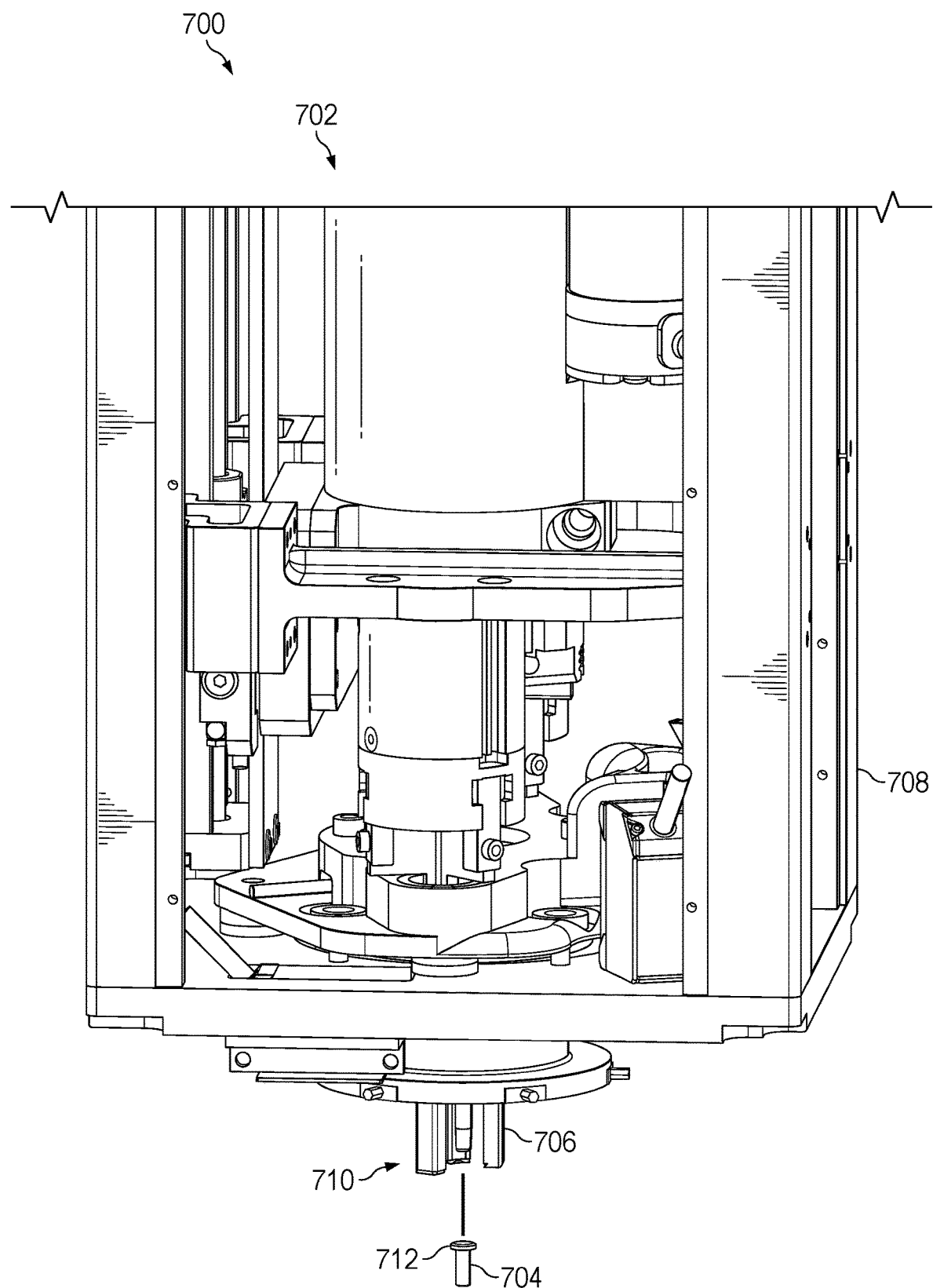
FIG. 7 is an illustration of a fastening end effector receiving a fastener head in accordance with an illustrative embodiment.

Turning now to FIG. 7, an illustration of a fastening end effector receiving a fastener head is depicted in accordance with an illustrative embodiment. In view 700, fastening end effector 702 is positioned to lift fastener 704. Fastening end effector 702 is a physical implementation of fastening end effector 202 in FIG. 2. In some illustrative examples, fastening end effector 702 is the same as fastening end effector 300 of FIGS. 3-5. In some illustrative examples, fastening end effector 702 comprises hammering insertion die 602 of FIG. 6.

In view 700, fastening end effector 702 is preparing to receive and grip fastener 704. In view 700, grippers 706 are extended outside of housing 708 of fastening end effector 702. As depicted, grippers 706 are in open position 710 to receive head 712 of fastener 704.

Figure 8:
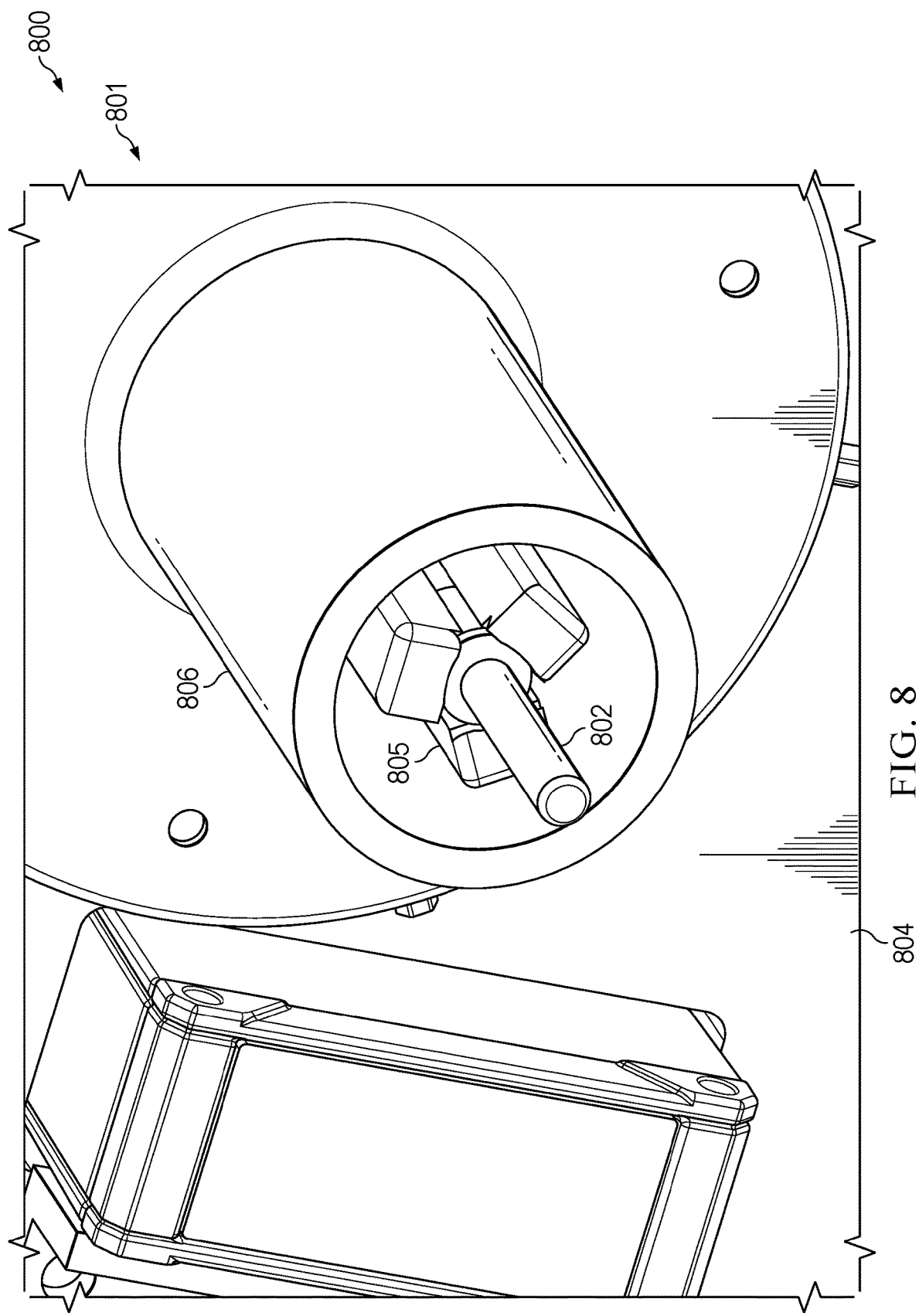
FIG. 8 is an illustration of grippers holding a fastener within a normalizing structure in accordance with an illustrative embodiment.

Turning now to FIG. 8, an illustration of grippers holding a fastener within a normalizing structure is depicted in accordance with an illustrative embodiment. In view 800, fastening end effector 801 holds fastener 802. Fastening end effector 801 is a physical implementation of fastening end effector 202 in FIG. 2. In some illustrative examples, fastening end effector 801 is the same as fastening end effector 300 of FIGS. 3-5. In some illustrative examples, fastening end effector 801 comprises hammering insertion die 602 of FIG. 6. In some illustrative examples, view 800 is a view of fastening end effector 702 retracting fastener 704 within fastening end effector 702.

In view 800, fastener 802 is being retracted into housing 804 of fastening end effector 801. In view 800, grippers 805 hold fastener 802. Fastener end effector 801 includes structure 806. In some illustrative examples, structure 806 is a normalizing structure. Retracting fastener 802 into housing 804 prevents fastener 802 from undesirably interfering with use of structure 806. Retracting fastener 802 into housing 804 protects fastener 802 during movement of fastening end effector 801 within a manufacturing environment.

Figure 9:
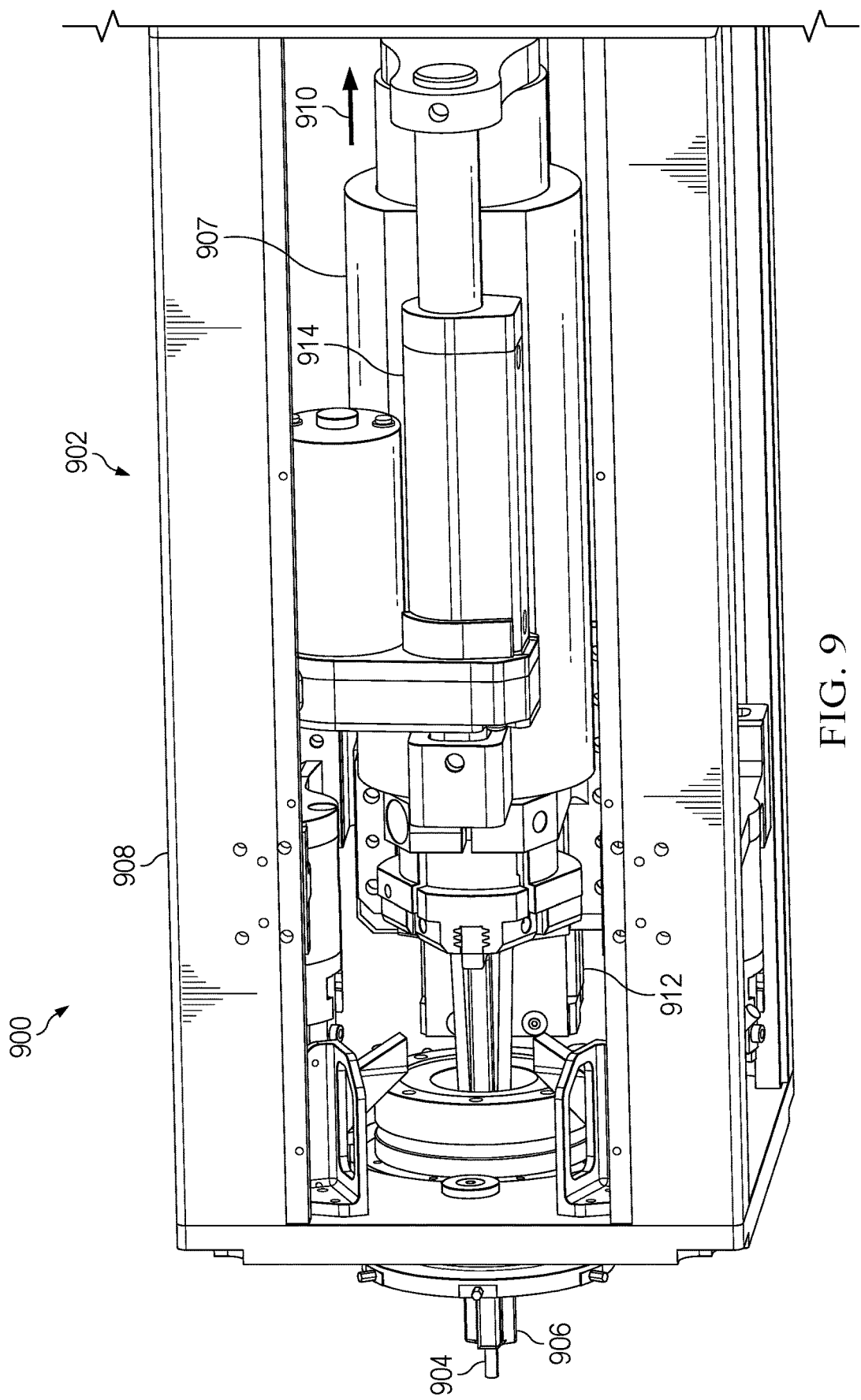
FIG. 9 is an illustration of fastening end effector retracting a fastener into a housing in accordance with an illustrative embodiment.

Turning now to FIG. 9, an illustration of fastening end effector retracting a fastener into a housing is depicted in accordance with an illustrative embodiment. In view 900, fastening end effector 902 holds fastener 904 outside of housing 908 of fastening end effector 902. Fastening end effector 902 is a physical implementation of fastening end effector 202 in FIG. 2. In some illustrative examples, fastening end effector 902 is the same as fastening end effector 300 of FIGS. 3-5. In some illustrative examples, fastening end effector 902 comprises hammering insertion die 602 of FIG. 6. In some illustrative examples, view 900 is a view of fastening end effector 702 with fastener 704. In some illustrative examples, view 900 is a view of fastening end effector 801 prior to retracting fastener 802 within fastening end effector 702.

Fastening end effector 902 comprises grippers 906 that hold fastener 904 against a hammering insertion die (not visible) of hammering system 907. As depicted in FIG. 9, fastener 904 and a portion of grippers 906 are extended outside of housing 908. To retract fastener 904 into housing 908, hammering system 907 moves in direction 910 using slide 912. Hammering system 907, including hammering force generator 914, travels along slide 912 to retract fastener 904 into fastening end effector 902.

Figure 10:
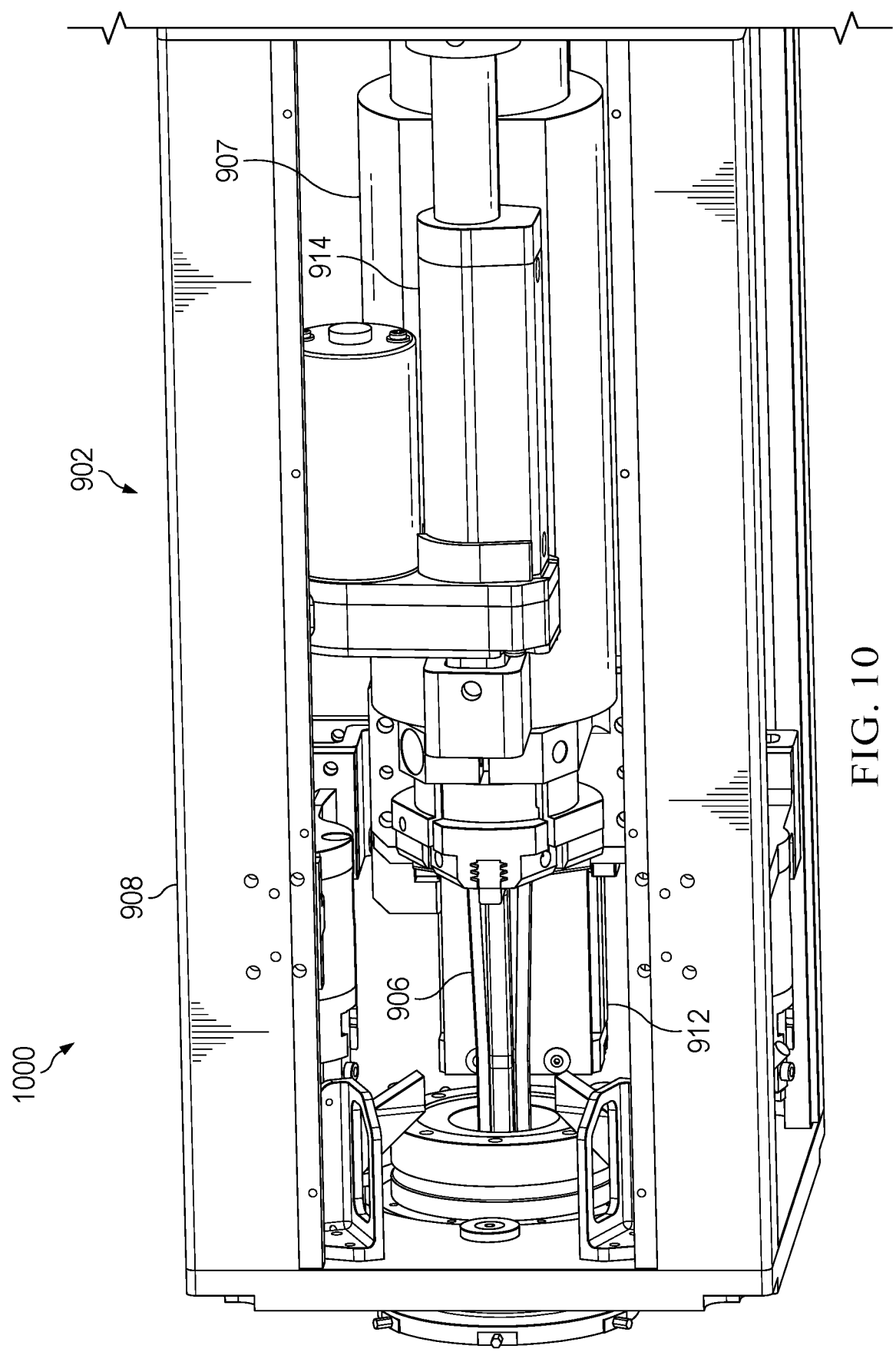
FIG. 10 is an illustration of fastening end effector holding a fastener retracted inside a housing in accordance with an illustrative embodiment.

Turning now to FIG. 10, an illustration of fastening end effector holding a fastener retracted inside a housing is depicted in accordance with an illustrative embodiment. In view 1000, hammering system 907 and fastener 904 (not visible in FIG. 10) have been retracted into housing 908. Between view 900 and view 1000, hammering system 907 has moved in direction 910. With fastener 904 within housing 908, fastening end effector 902 can move within a manufacturing environment without undesirably impacting fastener 904.

Figure 11:
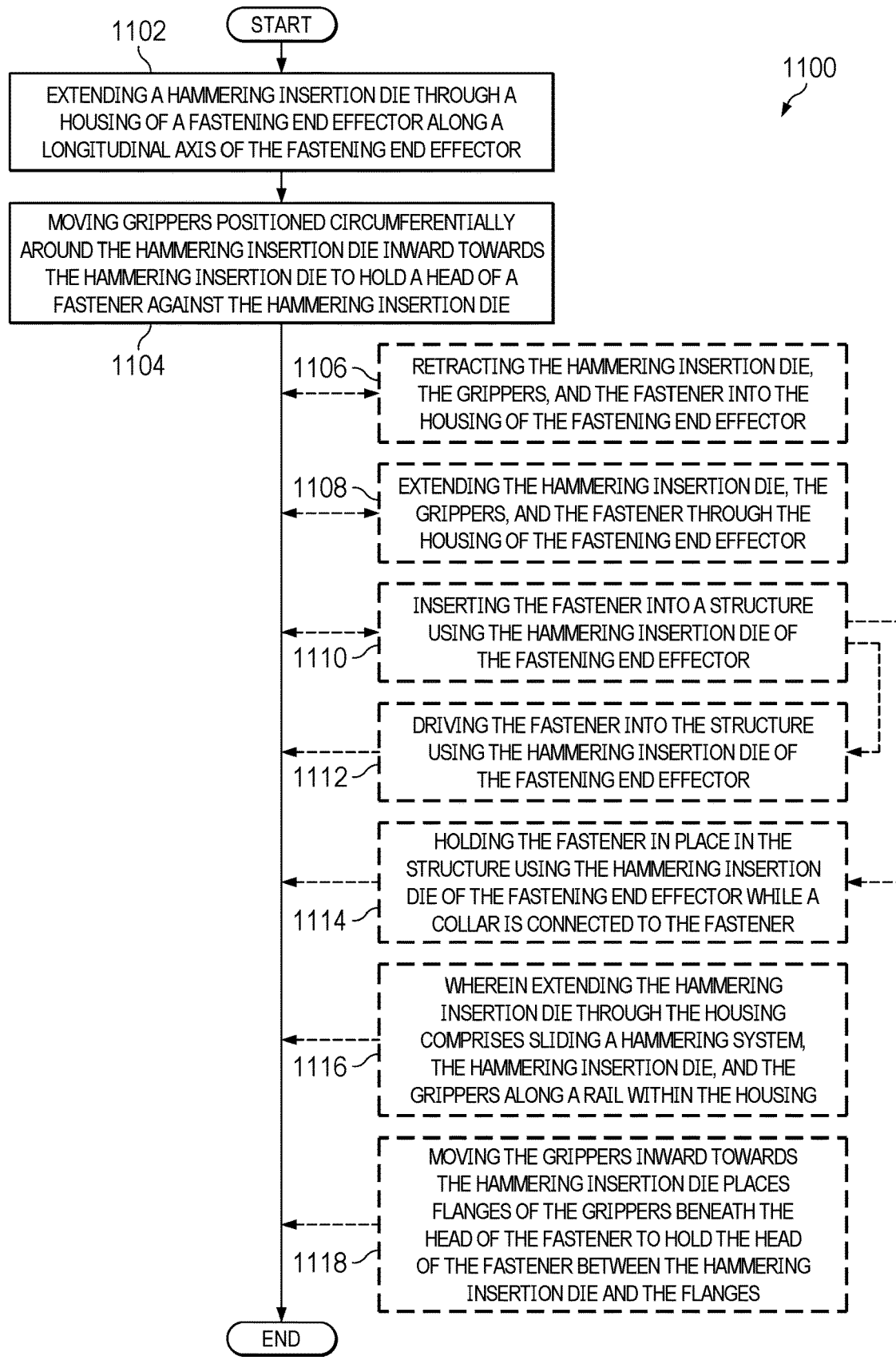
FIG. 11 is a flowchart of a method of operating a fastening end effector in accordance with an illustrative embodiment.

Turning now to FIG. 11, a flowchart of a method for operating a fastening end effector is depicted in accordance with an illustrative embodiment. Method 1100 can be performed using fastening end effector 202 of FIG. 2. Method 1100 can be performed using fastening end effector 300 of FIGS. 3-5. Method 1100 can be performed using hammering insertion die 602 of FIG. 6. Method 1100 can be performed using fastening end effector 702 of FIG. 7. Method 1100 can be performed using fastening end effector 801 of FIG. 8. Method 1100 can be performed using fastening end effector 902 of FIGS. 9-10.

Method 1100 begins by extending a hammering insertion die through a housing of a fastening end effector along a longitudinal axis of the fastening end effector (operation 1102). The hammering insertion die is extended through the housing by moving a hammering system comprising the hammering insertion die along a rail within the housing. Grippers positioned circumferentially around the hammering insertion die are then moved inward towards the hammering insertion die to hold a head of a fastener against the hammering insertion die (operation 1104). The hammering system comprises the grippers and the hammering insertion die. Afterwards, method 1100 terminates.

In some illustrative examples, method 1100 further comprises retracting the hammering insertion die, the grippers, and the fastener into the housing of the fastening end effector (operation 1106). By retracting the fastener into the housing of the fastening end effector, the fastening end effector can move and perform other operations without undesirably affecting the fastener. In some illustrative examples, retracting the fastener into the housing reduces the size of the assembly moving within the manufacturing environment.

In some illustrative examples, method 1100 may further comprise extending the hammering insertion die, the grippers, and the fastener through the housing of the fastening end effector (operation 1108) and inserting the fastener into a structure using the hammering insertion die of the fastening end effector (operation 1110). The structure may comprise metal, wherein inserting the fastener in operation 1110 comprises driving the fastener into the structure using the hammering insertion die of the fastening end effector (operation 1112). Alternatively, the structure may comprise composite material, wherein inserting the fastener in operation 1110 comprises holding the fastener in place in the structure using the hammering insertion die of the fastening end effector while a collar is connected to the fastener (operation 1114).

Extending the hammering insertion die through the housing in operation 1102 may comprise sliding a hammering system, the hammering insertion die, and the grippers along a rail within the housing (operation 1116).

Moving the grippers inward towards the hammering insertion die in operation 1104 may place flanges of the grippers beneath the head of the fastener to hold the head of the fastener between the hammering insertion die and the flanges (operation 1118).

Figure 12:
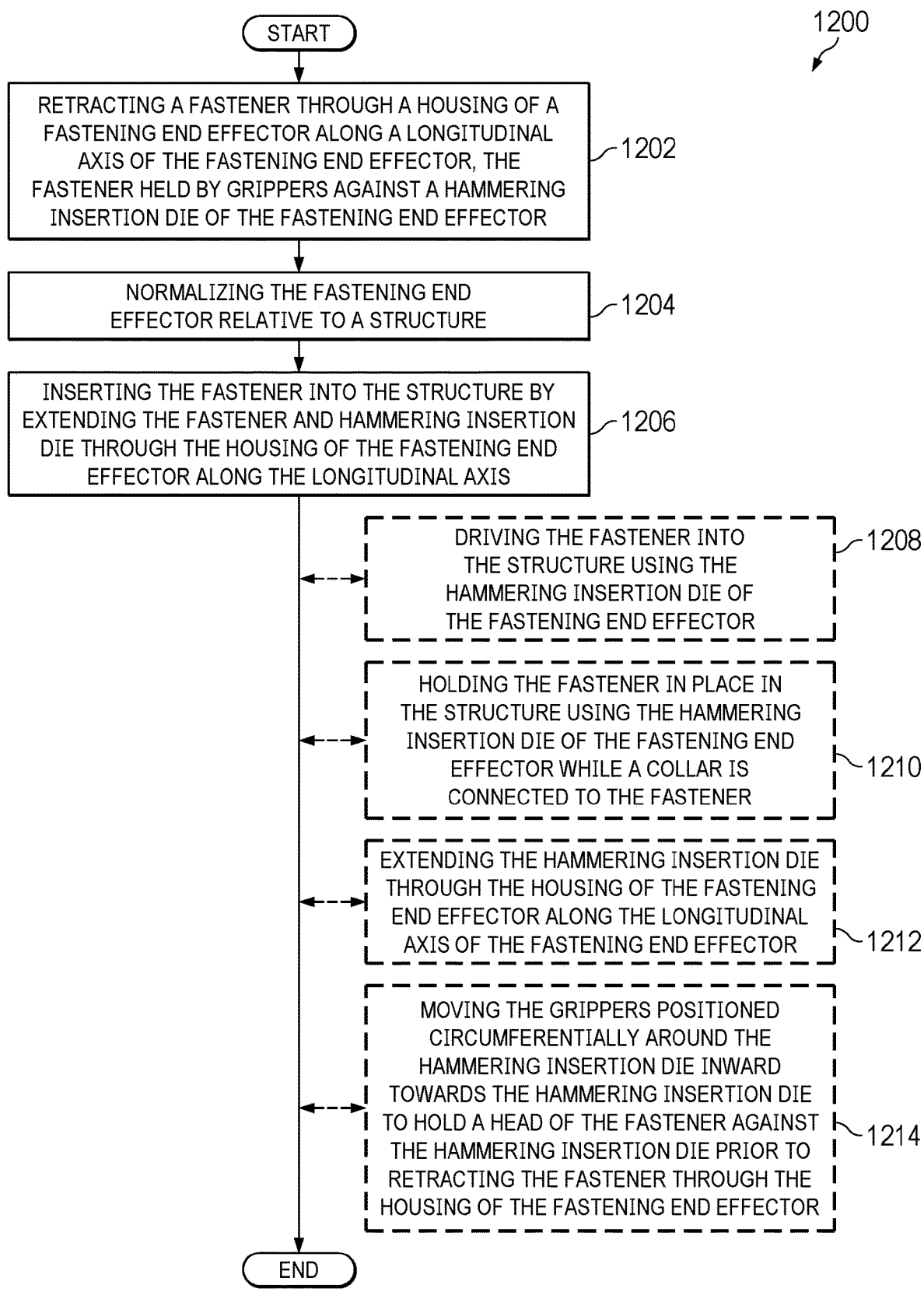
FIG. 12 is a flowchart of a method of fastening a structure in accordance with an illustrative embodiment.

Turning now to FIG. 12, a flowchart of a method for fastening a structure is depicted in accordance with an illustrative embodiment. Method 1200 can be performed using fastening end effector 202 of FIG. 2. Method 1200 can be performed using fastening end effector 300 of FIGS. 3-5. Method 1200 can be performed using hammering insertion die 602 of FIG. 6. Method 1200 can be performed using fastening end effector 702 of FIG. 7. Method 1200 can be performed using fastening end effector 801 of FIG. 8. Method 1200 can be performed using fastening end effector 902 of FIGS. 9-10.

Method 1200 begins by retracting a fastener through a housing of a fastening end effector along a longitudinal axis of the fastening end effector, the fastener held by grippers against a hammering insertion die of the fastening end effector (operation 1202). The fastener is retracted into the housing by moving a hammering system along a rail within the housing. The hammering system comprises the grippers and the hammering insertion die.

Method 1200 normalizes the fastening end effector relative to a structure (operation 1204). The fastening end effector can be normalized relative to the structure in any desirable way. In some illustrative examples, the fastening end effector is normalized using at least one of cameras, lasers, or physical components.

Method 1200 inserts the fastener into the structure by extending the fastener and hammering insertion die through the housing of the fastening end effector along the longitudinal axis (operation 1206). The fastener is inserted into the structure by moving the hammering system along the rail. Afterwards, method 1200 terminates.

In some illustrative examples, the structure comprises metal. In some of these illustrative examples, inserting the fastener in operation 1206 comprises driving the fastener into the structure using the hammering insertion die of the fastening end effector (operation 1208).

In some illustrative examples, the structure comprises composite material. In some of these illustrative examples, inserting the fastener in operation 1206 comprises holding the fastener in place in the structure using the hammering insertion die of the fastening end effector while a collar is connected to the fastener (operation 1210).

In some illustrative examples, method 1200 extends the hammering insertion die through the housing of the fastening end effector along the longitudinal axis of the fastening end effector (operation 1212). In some illustrative examples, method 1200 moves the grippers positioned circumferentially around the hammering insertion die inward towards the hammering insertion die to hold a head of the fastener against the hammering insertion die prior to retracting the fastener through the housing of the fastening end effector (operation 1214).

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram. Some blocks may be optional. For example, any of operation 1106 through operation 1118 may be optional. As another example, any of operation 1208 through operation 1214 may be optional.

Figure 13:
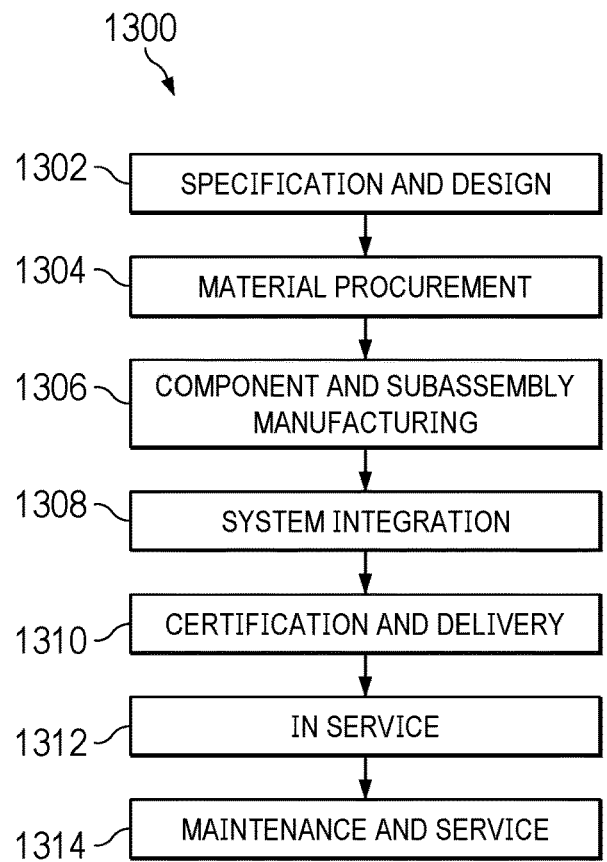
FIG. 13 is an illustration of a block diagram of an aircraft in which an illustrative embodiment may be implemented.
Figure 14:
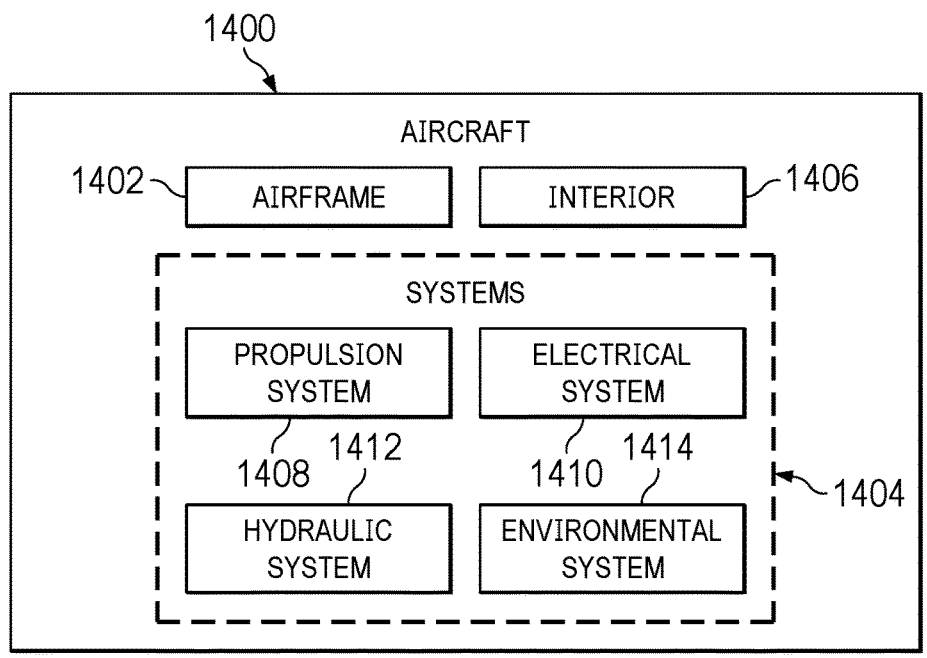
FIG. 14 is an illustration of a block diagram of a product management system is depicted in accordance with an illustrative embodiment.

Illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 can go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13.

In one illustrative example, components or subassemblies produced in component and subassembly manufacturing 1306 in FIG. 13 can be fabricated or manufactured in a manner similar to components or subassemblies produced while aircraft 1400 is in service 1312 in FIG. 13. As yet another example, one or more apparatus embodiments, method embodiments, or a combination thereof can be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 in FIG. 13, or both. The use of a number of the different illustrative embodiments may substantially expedite the assembly of aircraft 1400, reduce the cost of aircraft 1400, or both expedite the assembly of aircraft 1400 and reduce the cost of aircraft 1400.

The illustrative examples present a fastener end effector that contains a gripper system that extends out of the end effector to pick the selected fastener at the fastener head. The gripper system has a hammer at its central core to drive the fastener into metallic structures and push and hold in place the fastener in composite structures. The fastener gripper extension system pulls the fastener into the inside of the end effector. In some illustrative examples, a sealant can be applied to the fastener prior to pulling the fastener inside of the end effector. In some illustrative examples, a nosepiece in front of the end effector contacts the surface of a structure for accurate positioning and normalization to the surface to occur. With the fastener inside of the fastening end effector, the nosepiece can contact the surface of the structure.

The hammering insertion die is centered in the gripper and moves independently of the gripper fingers. The hammering mechanism is installed on the top of the motor that operates the gripper extension mechanism and slides on a linear axis slide moving the gripper extension mechanism forward and back. In some illustrative examples, the hammering insertion die is fabricated from a polymer material filled in the core with heavy tungsten material to be used for driving the fastener into metallic structures.

The gripper extension and installation mechanism enable gripping the fastener, and bringing the fastener to the inside of the end effector where it stays during positioning and normalizing. In some illustrative examples, normalizing is performed with the external nosepiece of the end effector. In some illustrative examples, a sealant can be applied to the fastener prior to bringing the fastener within the housing of the end effector.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A fastening end effector comprising:
    a hammering insertion die;
    grippers positioned circumferentially around the hammering insertion die to hold a head of a fastener against the hammering insertion die, the grippers independently moveable radially relative to the hammering insertion die; and
    the hammering insertion die and the grippers together translatable into and out of a housing of the fastening end effector along a longitudinal axis of the fastening end effector.

2. The fastening end effector of claim 1 further comprising:
    a frame having channels configured to guide radial movement of the grippers relative to the hammering insertion die.

3. The fastening end effector of claim 1 further comprising:
    a hammering force generator connected to the hammering insertion die and configured to translate along the longitudinal axis of the fastening end effector with the hammering insertion die.

4. The fastening end effector of claim 1 further comprising:
    a mount connected to a slide facilitating translation of the hammering insertion die and the grippers along the longitudinal axis of the fastening end effector.

5. The fastening end effector of claim 1 wherein the hammering insertion die comprises:
    an exterior material surrounding an interior material, the interior material having a greater density than the exterior material.

6. The fastening end effector of claim 5, wherein the exterior material comprises a polymeric material.

7. The fastening end effector of claim 5, wherein the interior material comprises a metal.

8. The fastening end effector of claim 5, wherein the interior material comprises tungsten.

9. The fastening end effector of claim 1, wherein the grippers comprise flanges configured to retain the head of the fastener against the hammering insertion die.

10. A method comprising:
    extending a hammering insertion die and attached grippers together through and out of a housing of a fastening end effector along a longitudinal axis of the fastening end effector, the hammering insertion die and the grippers together translatable into and out of the housing of the fastening end effector along the longitudinal axis of the fastening end effector; and
    moving the grippers positioned circumferentially around the hammering insertion die inward towards the hammering insertion die to hold a head of a fastener against the hammering insertion die, the grippers independently moveable radially relative to the hammering insertion die.

11. The method of claim 10 further comprising:
    retracting the hammering insertion die, the grippers, and the fastener into the housing of the fastening end effector.

12. The method of claim 10 further comprising:
extending the hammering insertion die, the grippers, and the fastener through the housing of the fastening end effector; and
inserting the fastener into a structure using the hammering insertion die of the fastening end effector.

13. The method of claim 12, wherein the structure comprises metal, and wherein inserting the fastener comprises:
driving the fastener into the structure using the hammering insertion die of the fastening end effector.

14. The method of claim 12, wherein the structure comprises composite material, and wherein inserting the fastener comprises:
holding the fastener in place in the structure using the hammering insertion die of the fastening end effector while a collar is connected to the fastener.

15. The method of claim 10, wherein extending the hammering insertion die and the attached grippers together through and out of the housing comprises sliding a hammering system, the hammering insertion die, and the grippers along a rail within the housing.

16. The method of claim 10, wherein
moving the grippers inward towards the hammering insertion die places flanges of the grippers beneath the head of the fastener to hold the head of the fastener between the hammering insertion die and the flanges.

17. A fastening end effector comprising:
a longitudinal axis; and
a hammering system translatable along the longitudinal axis, the hammering system comprising: a hammering insertion die, grippers positioned circumferentially around the hammering insertion die to hold a head of a fastener against the hammering insertion die, the grippers independently moveable radially relative to the hammering insertion die, and a force application mechanism, wherein the hammering insertion die and the grippers are together translatable into and out of a housing of the fastening end effector along the longitudinal axis.

18. The fastening end effector of claim 17 further comprising:
a frame having channels configured to guide radial movement of the grippers relative to the hammering insertion die.

19. The fastening end effector of claim 17 further comprising:
a motor configured to move the grippers relative to the hammering insertion die.

20. A method of fastening a structure, the method comprising:
retracting a fastener into a housing of a fastening end effector along a longitudinal axis of the fastening end effector, the fastener held by grippers against a hammering insertion die of the fastening end effector, the grippers positioned circumferentially around the hammering insertion die to hold a head of the fastener against the hammering insertion die, the grippers independently moveable radially relative to the hammering insertion die;
normalizing the fastening end effector relative to a structure; and
inserting the fastener into the structure by extending the fastener and the hammering insertion die and the grippers through and out of the housing of the fastening end effector along the longitudinal axis, the hammering insertion die and the grippers together translatable into and out of the housing along the longitudinal axis.

* * * * *